Patented Sept. 11, 1923.

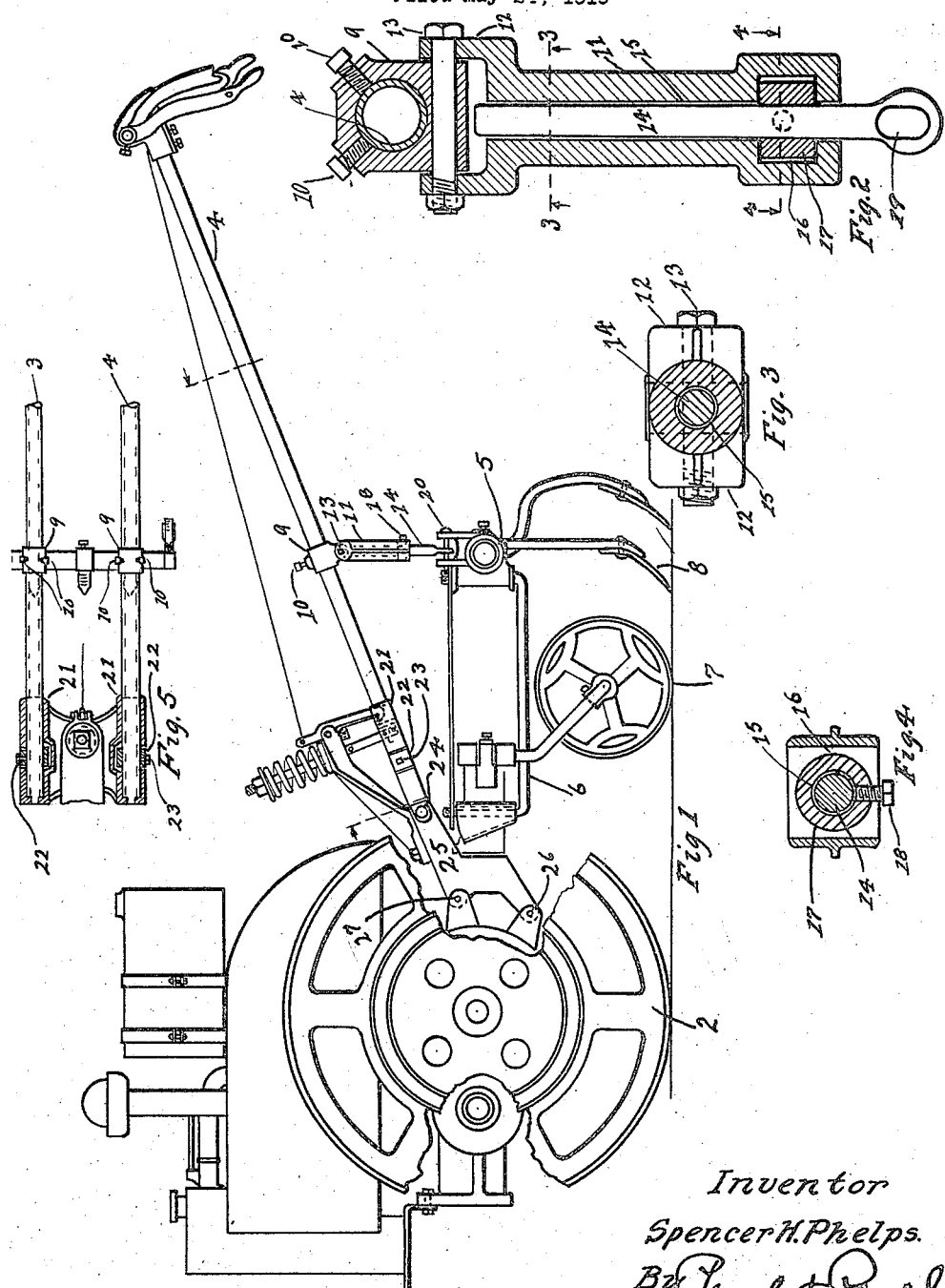

1,467,685

UNITED STATES PATENT OFFICE.

SPENCER H. PHELPS, OF MINNEAPOLIS, MINNESOTA, ASSIGNOR, BY MESNE ASSIGNMENTS, TO BEEMAN TRACTOR COMPANY, OF MINNEAPOLIS, MINNESOTA, A CORPORATION OF MINNESOTA.

SHIFTING STRAP FOR AGRICULTURAL IMPLEMENTS.

Application filed May 24, 1919. Serial No. 299,551.

*To all whom it may concern:*

Be it known that I, SPENCER H. PHELPS, a citizen of the United States, resident of Minneapolis, county of Hennepin, State of Minnesota, have invented certain new and useful Improvements in Shifting Straps for Agricultural Implements, of which the following is a specification.

My invention relates to an attachment for an agricultural implement and particularly a garden tractor in which the cultivator or other ground-working implement is connected with the handle or steering bars to enable the operator to lift the implement or shift it from side to side during the operation of the machine.

The object of my invention is to provide a connection between the handle bars and the ground-working implement which will allow the implement to be raised, shifted from side to side, as desired, without any danger of cramping or binding the connections.

Other objects of the invention will appear from the following detailed description.

The invention consists generally in various constructions and combinations, all as hereinafter described and particularly pointed out in the claims.

In the accompanying drawings forming part of this specification,

Figure 1 is a side view of a garden tractor with my invention applied thereto,

Figure 2 is a sectional view of the shifting device,

Figure 3 is a sectional view on the line 3—3 of Figure 2,

Figure 4 is a sectional view on the line 4—4 of Figure 2,

Figure 5 is a detail view showing the connections of the shifting devices with the steering posts.

In the drawings, 2 represents a garden tractor having steering posts 3 and 4, pivoted at 24 for vertical movement on the machine and mounted for rotary movement on a longitudinal axis for adjusting the ground-working implement from side to side of the machine. These posts are also moved laterally to oscillate the tractor on a vertical axis to steer it between the rows of plants.

5 represents a ground-working implement having draft connections 6 with the frame of the tractor and suitable guide or caster wheels 7. I have shown this implement provided with cultivators 8 but my invention may be used with other ground-working implements, such as a plow with a beam, if preferred. The attachment, however, and the manner of using the device are substantially the same for all kinds of ground-working implements and it is sufficient, therefore, in this case to merely illustrate the application to one style.

The steering posts 3 and 4 are provided with collars 9 having holes therein to receive the posts and secured thereon by means of set screws 10. A shank 11 has parallel arms 12 formed thereon at one end to straddle the lower portion of the collar 9 and bolt 13 passing through said arms and through said collar pivotally connect them and allows freedom of oscillation of the shank forward and backward with respect to the steering posts.

14 represents a rod loosely fitting within a socket 15 in the shank 11 and free to rotate therein, or the shank may rotate on the rod. The lower portion of the shank has a recess 16 therein and a collar 17 is mounted on the rod within said recess and secured by suitable means, such as a set screw 18. This collar holds the rod and shank against relative longitudinal movement while permitting them to rotate freely one upon the other.

The lower end of the rod has a longitudinal slot 19 therein and a bolt 20 mounted in the frame 5 of the ground-working implement passes through this slot and allows freedom of oscillation of the rod thereon and also a limited vertical movement. This shifting device is in effect a universal joint connection between the frame of the ground-working implement and the steering posts and besides having all the functions of lifting straps for transmitting downward pressure of the steering posts on the frame of the agricultural implement and lifting the implement clear of the ground when the posts are raised, also allows freedom of longitudinal rotation of the posts to shift the implement from side to side or lateral movement thereof to steer the machine. The device for allowing freedom of movement of the posts is flexible, as much so as a chain or cable would be at this point, but for exerting a downward pressure on the frame of the ground-working implement the connection becomes rigid and inflexible.

In Figure 5 I have shown the steering posts 3 and 4 mounted in a casting 21 for rotary movement on a longitudinal axis, such movement being limited by means of collars 22 fitting within recesses in the castings and mounted on the posts and secured by means of set screws 23. Vertical movement of the posts is accomplished by oscillation of the casting 21 with the posts on a horizontal pivot 24 that is mounted in the yoke 25 that is connected to the frame of the machine at 26 and 27.

I claim as my invention:

1. A universal joint connection comprising a shank having a pivoted horizontal bearing and a rod having a comparatively long vertical bearing in said shank.

2. A universal joint connection comprising a shank having a pivoted horizontal bearing and a rod having a comparatively long vertical bearing in said shank, said rod having freedom of rotary movement in said shank but held against longitudinal movement.

3. A universal joint comprising a shank, a block having a horizontal pivot therein and a socket, a rod fitting a longitudinal socket in said shank and having freedom of rotary movement therein.

4. A universal joint comprising a shank, a rod fitting within a longitudinal socket in said shank, and a collar mounted on said rod and permitting rotary movement thereof in said shank but preventing longitudinal movement.

5. A universal joint comprising a shank having a forked end, a block having a horizontal pivot in said forked end and provided with a socket, said shank having a longitudinal socket therein, a rod fitting within said socket, and means permitting rotary movement of said rod in said socket and preventing longitudinal movement thereof.

6. A universal joint comprising a shank having a connecting means pivoted at one end transversely of the shank a connecting means at the other end of said shank and mounted for rotary movement in said shank but held against longitudinal movement therein.

7. A universal joint comprising a shank or member mounted at one end thereof for oscillation on a horizontal pivot, a member mounted in the other end of said shank for rotation on a longitudinal axis.

8. A universal joint comprising a shank or member mounted at one end thereof for oscillation on a horizontal pivot a member mounted in the other end of said shank for rotation on a longitudinal axis, and said last named member having means for preventing longitudinal movement thereof in said shank.

In witness whereof, I have hereunto set my hand this 16th day of May, 1919.

SPENCER H. PHELPS.